(12) United States Patent
Fortin et al.

(10) Patent No.: US 10,496,682 B2
(45) Date of Patent: Dec. 3, 2019

(54) CUSTOM REGION GENERATOR FOR GEOSPATIAL VISUALIZATION

(71) Applicant: SAP SE, Walldorf (DE)

(72) Inventors: Alexandre Fortin, Paris (FR); Yannick Besnehard, Paris (FR)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 15/180,473

(22) Filed: Jun. 13, 2016

(65) Prior Publication Data

US 2017/0357668 A1 Dec. 14, 2017

(51) Int. Cl.
*G06F 16/00* (2019.01)
*G06F 16/29* (2019.01)
(Continued)

(52) U.S. Cl.
CPC .......... *G06F 16/29* (2019.01); *G06F 16/248* (2019.01); *G06F 16/9537* (2019.01); *G06Q 30/0201* (2013.01); *H04W 4/021* (2013.01)

(58) Field of Classification Search
CPC .... G06F 17/30241; G06F 3/017; G06F 3/013; G06F 17/3087; G06F 17/5009; G06F 1/163; G06F 3/012; G06F 3/03545; G06F 17/30256; G06F 17/3028; G06F 17/30867; G06F 3/04842; G06F 5/10; G06F 17/18; G06F 17/30259; G06F 17/30265; G06F 17/30563; G06F 17/30879; G06F 2217/16; G06F 3/005; G06F 3/011; G06F 3/016; G06F 3/0482; G06F 3/04845; G06F 17/30023; G06F 17/3005; G06F 17/30268; G06F 3/0236; G06F 3/0304; G06F 3/0325; G06F 3/0346; G06F 3/04812; G06F 3/04847; G06F 3/04883; G06F 17/10; G06F 17/11; G06F 17/13; G06F 17/16; G06F 17/211; G06F 17/241; G06F 17/30247; G06F 17/30312; G06F 17/3048; G06F 17/3053; G06F 17/30554; G06F 17/30572; G06F 17/30864; G06F 17/30873; G06F 17/30896; G06F 17/30997; G06F 17/50; G06F 17/5004; G06F 19/00; G06F 19/24; G06F 19/26; G06F 19/28; G06F 19/326; G06F 21/552; G06F 21/554;
(Continued)

(56) References Cited

U.S. PATENT DOCUMENTS 6,184,823 B1 * 2/2001 Smith .................... G01C 21/32
342/357.31
7,107,285 B2 * 9/2006 von Kaenel ...... G06F 17/30241
(Continued)

*Primary Examiner* — Yicun Wu
(74) *Attorney, Agent, or Firm* — Buckley, Maschoff & Talwalkar LLC

(57) ABSTRACT

The exemplary embodiments provide methods and systems for customizing a geospatial visualization. In one example, a method includes receiving a geospatial file that when executed displays an outline of a geographic area divided into predefined regions, generating a modified display for the for the geographic area based on a data file that configures customized regions for the geographic area, where the customized regions are different than the predefined regions, and displaying the generated modified display for the geographic area comprising an outline of the geographic area divided into the customized regions.

21 Claims, 14 Drawing Sheets

(51) Int. Cl.
*G06F 16/248* (2019.01)
*G06F 16/9537* (2019.01)
*G06Q 30/02* (2012.01)
*H04W 4/021* (2018.01)

(58) Field of Classification Search
CPC ...... G06F 21/566; G06F 21/577; G06F 21/60;
G06F 2203/04803; G06F 3/014; G06F
3/03542; G06F 3/03547; G06F 3/0362;
G06F 3/041; G06F 3/0481; G06F
3/04817; G06F 3/1206; G06F 3/1292;
G06F 7/02
See application file for complete search history.

(56) References Cited

U.S. PATENT DOCUMENTS

| | | | | |
|---|---|---|---|---|
| 9,779,129 | B1* | 10/2017 | Lequeux | G06F 17/30303 |
| 2015/0193630 | A1* | 7/2015 | Von Kaenel | G06F 17/30241 |
| | | | | 707/785 |

* cited by examiner

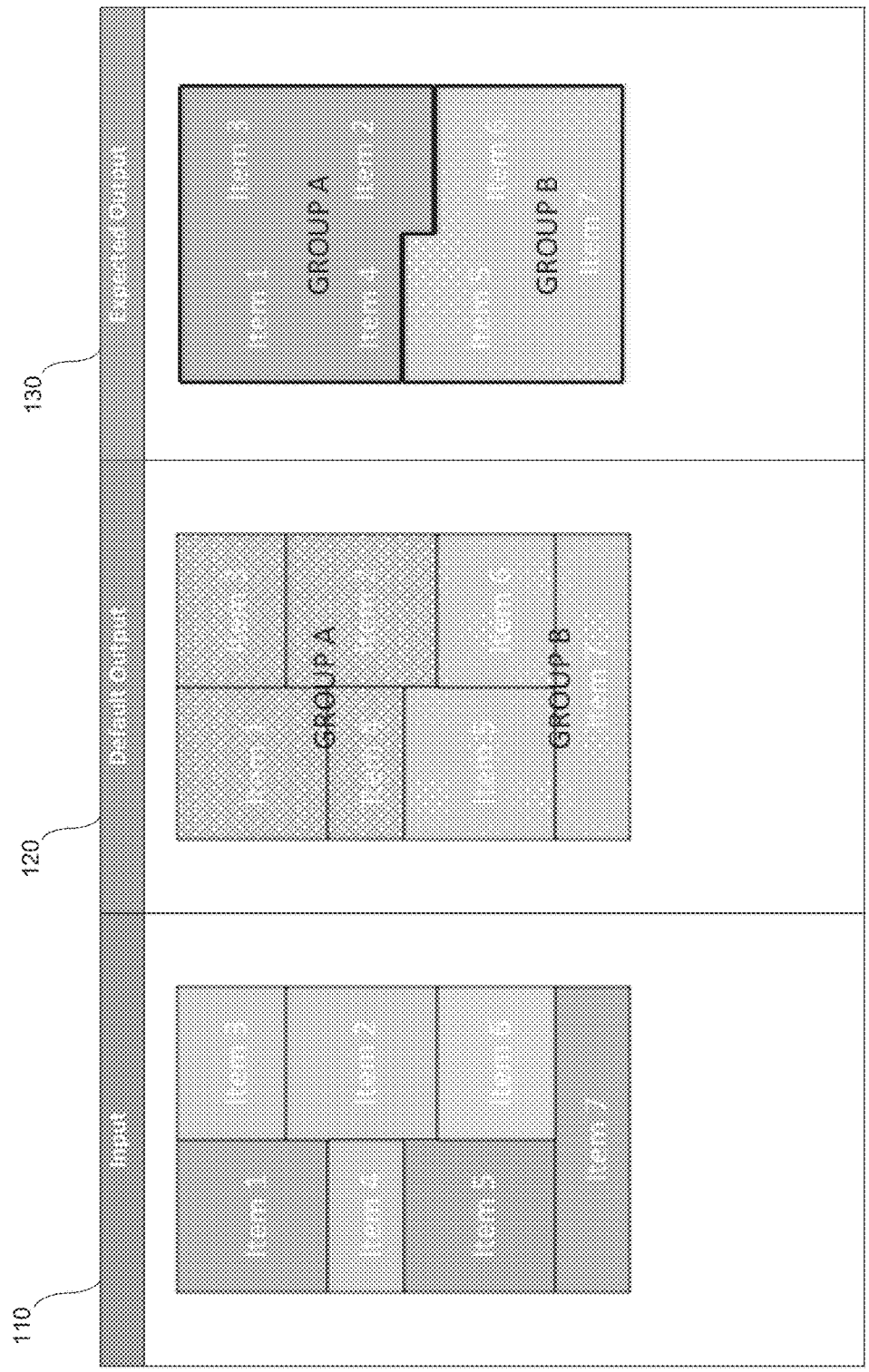

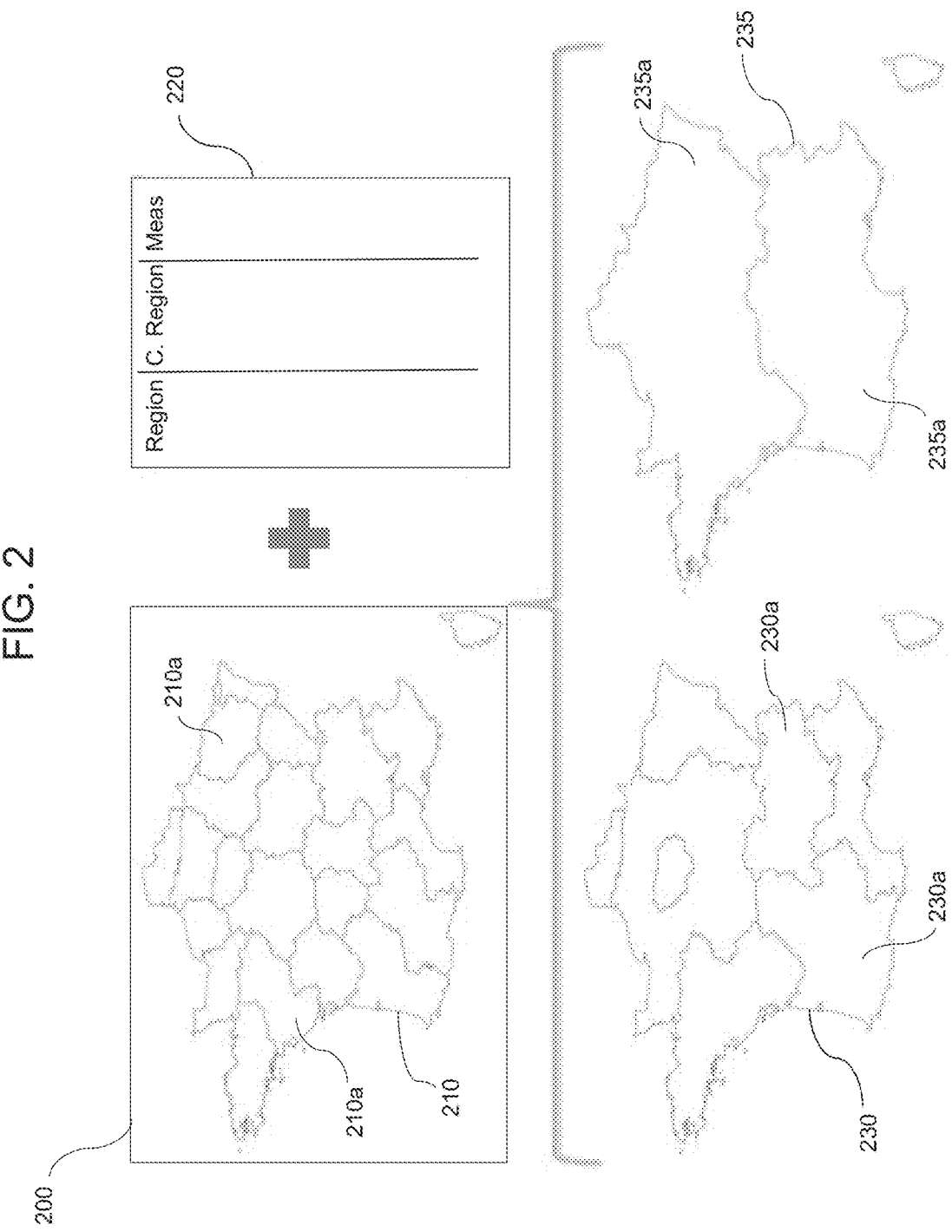

FIG. 3D
Custom Regions Producer
Based on your selection, 2 custom regions will be produced
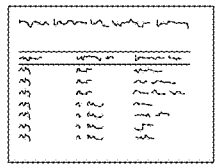
Customer Country | 100% | Customer Country
Choose Dimensions
○ Region
○ Market Unit
○ ~~Customer Country (Already produced)~~
PREVIEW
OK | Cancel
FIG. 3E
○ SmartBI
No of Message by Region, market Unit, Customer Country
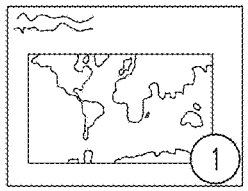 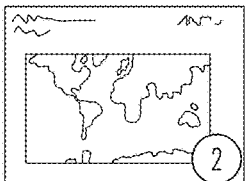 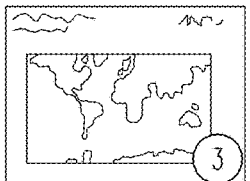 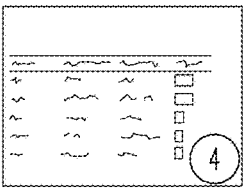
　　　① 　　　② 　　　③ 　　　④
　　　　　　　└ 331 　└ 332
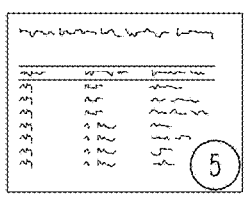
　　　⑤

FIG. 4C
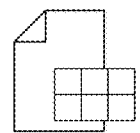
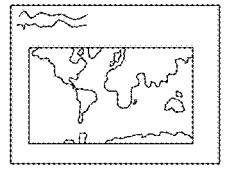
Custom Regions Producer — 400
Based on your selection, 2 custom regions will be produced
[Country]   [100%]   [Customer Country]
Choose Dimensions
○ Region
○ Market Unit
○ ~~Country (Already produced)~~
PREVIEW
[OK] [Cancel]
FIG. 4D
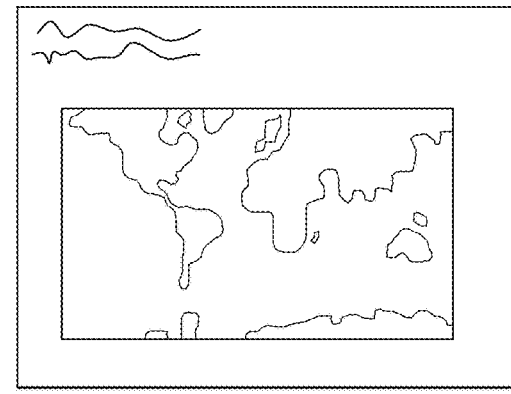
430

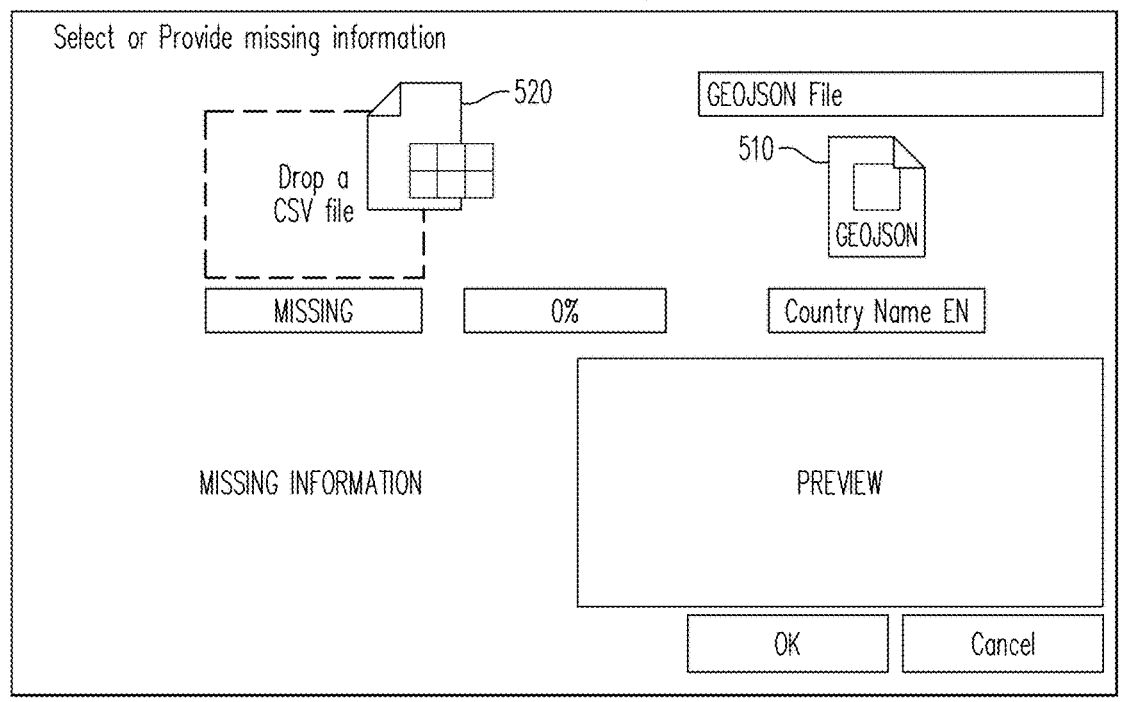

CUSTOM REGION GENERATOR FOR GEOSPATIAL VISUALIZATION

BACKGROUND

Geospatial analysis applies analytics to data based on geographical aspects and allows users to view and quickly identify dimension values based on geographic location. Many organizations are turning to new data types and new forms of analysis to remain competitive. An organization may apply the context of time, location, and the like, to traditional data, to identify changes over time and also a geospatial location where those changes are taking place. Geospatial analysis typically employs software capable of rendering maps by processing spatial data, and applying analytical methods to terrestrial or geographic datasets, including the use of geographic information systems. Geospatial analysis may be used to predict the occurrence of events at a specific location and at a future point in time. Geospatial analysis may generate patterns and trends in a recognizable geographic context making the data easy to understand and act upon. Organizations may anticipate and prepare for possible changes caused by changing spatial conditions or various location based events. Organizations may also develop targeted solutions to business challenges that may require different responses for different locations.

Simple geographic features may be generated based on a geographical file format. For example, the features may include points such as addresses and locations, line strings including highways and boundaries, polygons representing countries, provinces, tracts of land, and the like, and multi-part collections of these features. These features need not represent physical world entities only, but may be used to represent virtual geographical locations, arbitrary locations, and the like. A geographical file format typically provides for a default or predetermined geographic regions which are used to represent geographic areas such as countries, states, provinces, tracts of land, and the like. For example, a continent may be broken up into countries, and a country may be broken up into provinces. However, when an organization or a person attempts to customize the geographic regions that divide these geographic areas, complications may occur. For example, to create customized geographies, specific geographic information system (GIS) tools are typically needed, several iterations are required to fine tune or polish the results of coding or format editing, and integration with analytical tools can require additional time in order to produce meaningful results from the edited geographies.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a process of adding customized regions to a polygonal map in accordance with an example embodiment.

FIG. 2 is a diagram illustrating a process of customizing a geospatial visualization for a geographic area in accordance with an example embodiment.

FIGS. 3A-3E are diagrams illustrating a user interface for customizing a geospatial visualization for a geographic area in accordance with an example embodiment.

FIGS. 4A-4D are diagrams illustrating a user interface for customizing a geospatial visualization for a geographic area in accordance with another example embodiment.

FIGS. 5A-5E are diagrams illustrating a user interface for customizing a geospatial visualization for a geographic area in accordance with another example embodiment.

Figure 3C:
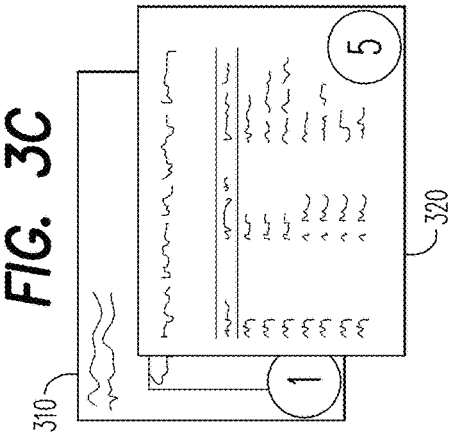

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Geospatial visualization is one of the most appreciated types of visualization techniques because of the advantages it provides. For example, geospatial visualizations enable a user to quickly identify geographical areas while comparing the areas for various attributes and measures. Further, enterprises and theirs subsidiaries may be organized by taking into account a geographical area in which they are located or where they would like to be located. Also, business units may be designed to ease comparison on raw values based on several criteria. Oftentimes, the boundaries or outlines of geographical areas are divided according to predefined regions or default regions. These regions may be based on a geographical file format, and the like. However, producing custom regions within a geospatial visualization can be complicated. For example, specific geographic information system (GIS) tools and specialized users may be needed to manipulate files and programming code, multiple iterations may be required to polish the result, and integration within analytical tools may require additional time to produce meaningful results.

Various example embodiments relate to a custom region producer for geospatial visualizations that allows custom regions to be created within a geospatial file with ease. When executed, a geospatial file may generate a representation of one or more geographic areas such as continents, countries, provinces, states, cities, towns, and the like. An example of a geospatial file format is a Geographical JavaScript Object Notation (GeoJSON) format. The generated representation of a geographical area may include a map shown on a display in which the geographic area is represented by an outline and further divided therein to show regions. For example, the geographic area may be a continent and the regions within may be countries that are included on that continent. When executed, run, processed, and/or the like, a geospatial file may generate a representation of a geographic area divided based on predefined regions which are defined in advance, for example, based on the geospatial file format. The custom region producer described herein may modify the predefined regions of the geographic area to generate a modified display of the geographic area based on custom regions generated by a user, a program, a system, and the like. For example, various embodiments may easily and quickly modify a geospatial file based on a data file such as a spreadsheet file, csv file, notepad file, word file, and the like. Accordingly, it is not necessary to manipulate the programming code, compiler, or the like, of a geospatial file, nor is it necessary to perform numerous rounds of testing on the geographic file to generate accurate customized regions within a geographic area.

The custom region producer may be included within a software environment and may include a user interface (UI). As a non-limiting example, the custom region producer may be included within a business-based software environment which is used to manage or identify business related areas of an organization such as sales, marketing, advertisements, client relations, and the like. The user interface may receive inputs from a user and control geographic outputs through the interface based on the user inputs. The user interface may initially display a geographic area based on the geospatial file in which predefined regions are used to divide the geographic area. That is, the geographic area may be divided into geographic regions that have been predefined, for example, based on the geographic file format, the system, and the like. Here, the geographic file may be built-into the software environment or it may be added from an external source. The user may modify the geographic area such that the predefined geographic regions within the geographic area are removed and replaced with customized geographic regions.

FIG. 1 illustrates a process of adding customized regions to a polygonal map in accordance with an example embodiment. Referring to FIG. 1, a predefined map 110 includes the outline of a rectangle (i.e., a polygon) along with seven predefined regions (i.e., also polygons) included therein. As used herein throughout, a polygon includes a plane figure bounded by line segments to form a closed loop. In the example of FIG. 1, simple four-sided polygons are shown, however, the examples are not limited thereto. In the examples herein, the lines of a polygon may be straight, curved, and the like, and angles may be included between the lines. The size and the shape of the resulting outline of a polygon is not limited to any particular shape, sides, angles, curvature, and the like. It should also be appreciated that as used herein the term polygon is not meant to limit the scope of the embodiments herein but is merely meant as an example.

The predefined map 110 may be a map corresponding to a geographic area, a virtual area, and the like. Furthermore, each of the polygons included therein may also correspond to geographic areas, virtual areas, and the like. As one example, the outline of the geographic area in predefined map 110 may represent the outline of a city whereas the seven predefined regions within the outline that divide the outlined area may represent seven towns within the city. The predefined map 110 may be shown on a display and may be the result of the execution of a geographic file by a processing device. According to various aspects, the predefined regions within the predefined map 110 may be modified or customized and shown on the display. Examples of modifying a geographic area are further described herein. In FIG. 1, the predefined regions in predefined map 110 are transformed into custom regions in customized map 130. In the customized map 130, the seven predefined regions are modified into two customized regions represented by Group A and Group B. The customized regions may be based on a shape of the predefined regions. For example, the customized regions may have an outline that corresponds to the outline of an aggregate of adjacent predefined regions. In this example, Group A includes an aggregate of predefined regions one, two, three, and four, and Group B includes an aggregate of predefined regions five, six, and seven. It should also be appreciated that an entire predefined region does not need to be included in one custom region. For example, one portion of a predefined region may be included in a first customized region and another mutually exclusive portion of the predefined region may be included in a second customized region.

Transitional map 120 illustrates the transition that occurs between predefined map 110 and customized map 130. In this example, the seven predefined regions from predefined map 110 are modified to produce two customized regions in the customized map 130. Here, the custom regions are the aggregation or combination of several predefined regions (i.e., several polygons) and may be aggregated together based on related information such as a common measurable. In these examples, a common measure or common measurable may be a product, an item, an amount, a group, or other type of data or information that is capable of being measured on a region-by-region basis. Boundaries of the customized regions may be generated based on boundaries of the predefined regions and/or they may be newly established. In FIG. 1, an outline of the custom region Group A includes the outer boundary lines of predefined regions four, one, three, and two, the inner boundary line between predefined region four and predefined region five, the inner boundary line between predefined region two and predefined region six, and the inner boundary line between predefined region two and predefined region five. After the boundary lines for the customized regions are generated in transitional map 120, the boundary lines for the predefined regions may be deleted resulting in modified map 130. The process to produce the customized regions can occur on a user workstation, a server, within a cloud environment, and the like.

FIG. 2 illustrates a process of customizing a geospatial visualization for a geographic area in accordance with an example embodiment. Referring to FIG. 2, a geospatial file 200 is executed to generate a displayed geographic area 210. In this non-limiting example, the displayed geographic area 210 corresponds to a country (i.e., France), has an outer boundary representing the outline of France, and is initially divided into a plurality of predefined regions 210a. Each of the predefined regions 210a may represent smaller geographic areas within the displayed geographic area 210 or they may be arbitrary areas. The predefined regions 210a of the geographic area 210 may be predefined based on a standard or format of a file type of the geospatial file 200. For example, the geospatial file 200 may have a format of a Geographic JavaScript Object Notation (JSON), and the like. FIG. 2 also illustrates a data file 220 which may be a spreadsheet file, data entry file, notepad file, and the like. The data file 220 may have a plurality of fields for each of the predefined regions 210a included in the geographic area 210. Here, the data file 220 may include alphanumeric characters identifying predefined regions 210a by name, location, and the like. The data file may include fields identifying regions, customized regions, measurable, sales, and the like.

Figure 6:
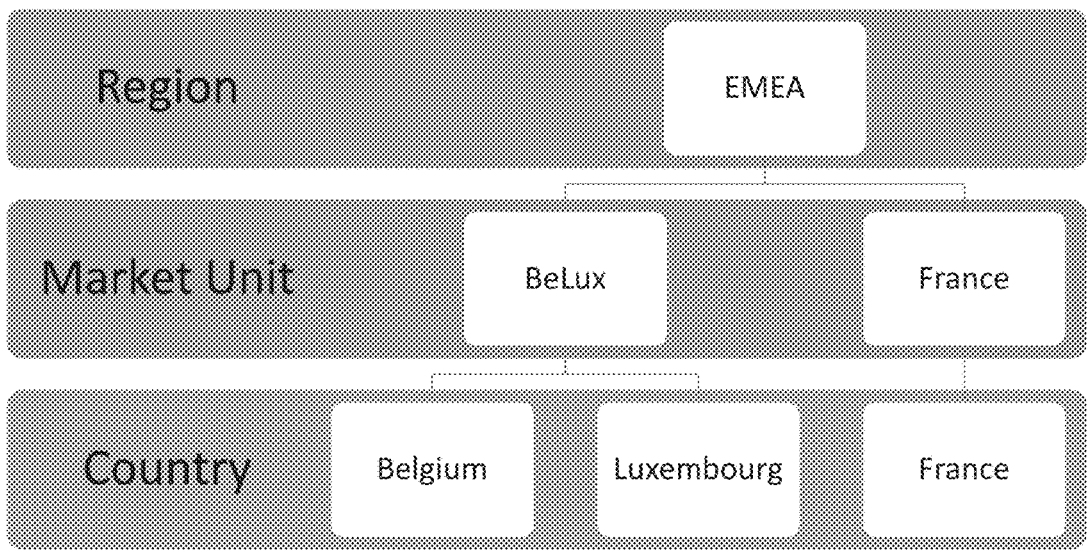
FIG. 6 is a diagram illustrating mapping relations between regions in a data file in accordance with an example embodiment.

An example of a data file 220 is shown in FIG. 6 wherein a table has multipole columns including a region (1) column, a market unit (2) column, a country (3) column, and an ISO (4) column. The regions are defined from top to bottom as shown on the lower area of FIG. 6 in which the geographic areas get smaller in area or stay the same. In this example, region (1) represents the largest geographic area and includes regions of one or more continents (e.g., an aggregate of continents), market unit (2) represents regions of one or more countries (e.g., an aggregate of countries), and country (3) represents individual countries. In some cases, the geographic area may not get smaller but may stay the same such as in the example of the market unit France and the country France. Further, the ISO (4) column includes values published by the International Organization for Standardization (ISO), and may be used to define codes for the names of countries, dependent territories, and special areas of geographical interest. In addition, the geospatial file 200 may include ISO data. For example, the ISO data may include an ISO code or ISO tag and may be used to define a predefined region 210a. For example, ISO code may define the outline or the outer boundary of each predefined region 210a within the geographic area 210 when the predefined regions 210a are displayed on a map. According to various aspects, the ISO data from the geospatial file 200 and the ISO data from the data file 220 may be used to associate the geospatial file 200 with the data file 220 in order to generate modified displays for the geographic area 210.

According to various aspects, a custom region producer as described herein may receive the geospatial file 200 and the data file 220 as inputs and generate a modified display for the geographic area 210 including customized regions. For example, based on a user command identifying or selecting the geospatial file 200 and the data file 220, the custom region producer may generate modified displayed geographic area 230, modified displayed geographic area 235, or the like. In this case, rather than code or a program for executing the geospatial file 200 being modified, the custom region producer merely receives the geospatial file 200 and the data file 220 as inputs and automatically generates the modified displays 230 and/or 235. Modified display 230 includes a plurality of customized regions 230a and modified display 235 includes a plurality of customized regions 235a. In both cases, the customized regions (230a and 235a) are different than the predefined regions 210. The custom region producer may generate actionable geospatial files that may be modified by data files to generate custom regions within a geographic area created by executing the geospatial file. Also, the custom region producer may generate a new geospatial file for each of the modified displays 230 and 235 based on the modifications made to geospatial file 200 using data file 220. For example, ISO data from the geospatial file 200 and ISO data from the data file 220 may be used to generate a new geospatial file including a modified display for the geographic area to include the custom regions instead of or in addition to the predefined regions.

Figure 10:
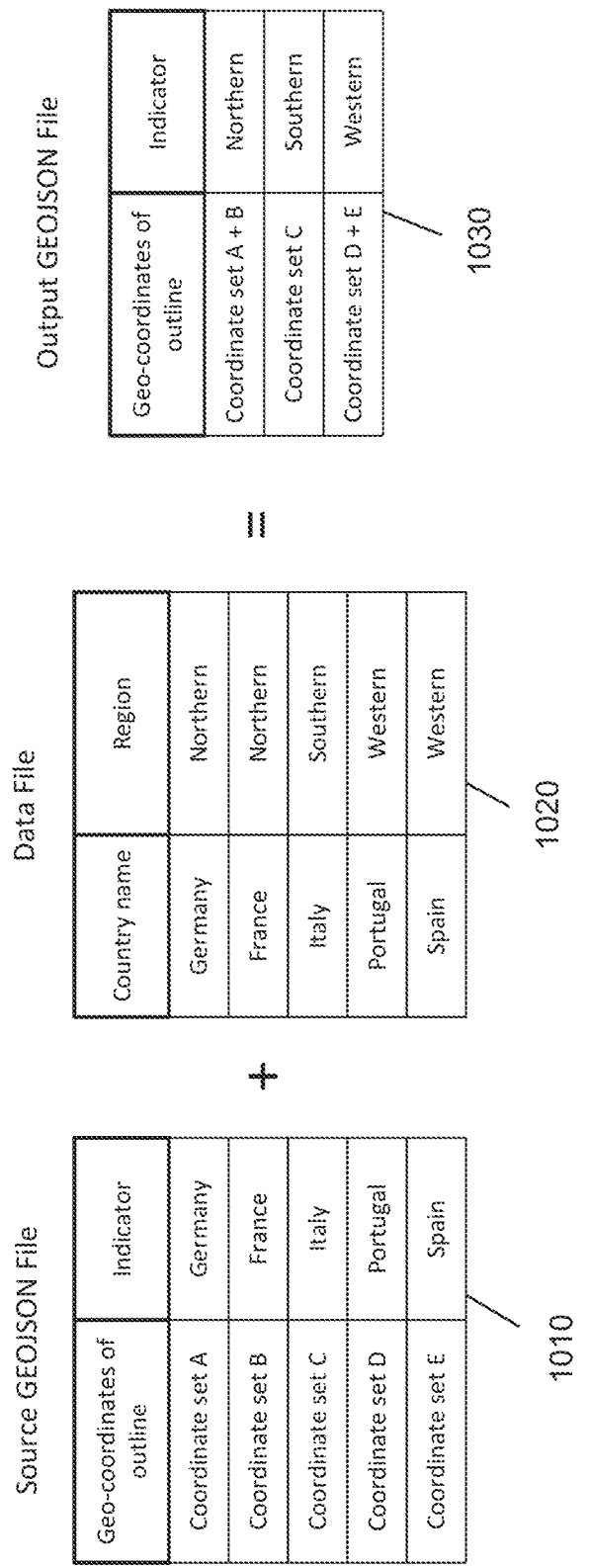
FIG. 10 is a diagram illustrating a process of generating modified data for a geographic area based on predefined data from a geospatial file and data from a data file, in accordance with an example embodiment.

According to various aspects, the predefined regions may divide the geographic area into a plurality of non-overlapping polygons respectively. Meanwhile, the customized regions may include an aggregate of at least two of the non-overlapping polygons. For example, one customized region may include two or more predefined regions. As a result, the customized regions may be greater in geographic size than the predefined regions. For example, FIG. 10 illustrates the process of generating a new geographic data based on predefined geographic data and a spreadsheet. In this example, geospatial data 1010 from a geospatial file and spreadsheet data 1020 from a data file are combined to generate a new geospatial file having a modified data set 1030. Here, predefined regions in the geospatial data 1010 correspond to countries and the customized regions in the modified data 1030 can correspond to individual countries (C) and to an aggregate of countries (A+B) and (D+E).

In the example of FIG. 2, the data file 220 may include a first column having fields identifying the predefined regions 210a corresponding to the geospatial file 200. The data file 220 may also include a second column having fields identifying a mapping between predefined regions 210a included in geographic area 210 and customized regions 230a included in modified displayed geographic area 230. The data file 220 may also include a third column identifying a mapping between the predefined regions 210a included in the geographic area 210 and customized regions 235a included in modified displayed geographic area 235. In this case, the user may determine a customization between modified geographic area 230 and modified geographic area 235. In FIG. 2, the first modified geographic area 230 has a plurality of customized regions 230a. Here, some of the customized regions 230a include an aggregate of multiple predefined regions 210a from geographic area 210 and some of the customized regions 230a are the same as predefined regions 210a. Meanwhile, the customized regions 235a of modified geographic area 235 each include an aggregate of predefined regions 210a from geographic area 210. The aggregations generating the customized regions may be formed of a group of predefined regions 210a that are located adjacent to one another. Also, in the modified geographic displays 230 and 235, outlines of the original predefined regions 210a are removed and replaced by the outlines of customized regions 230a and 235a, respectively.

Figure 3A:
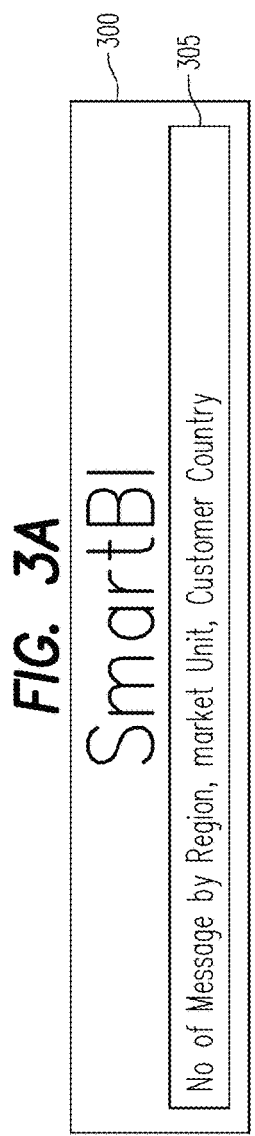
Figure 3B:
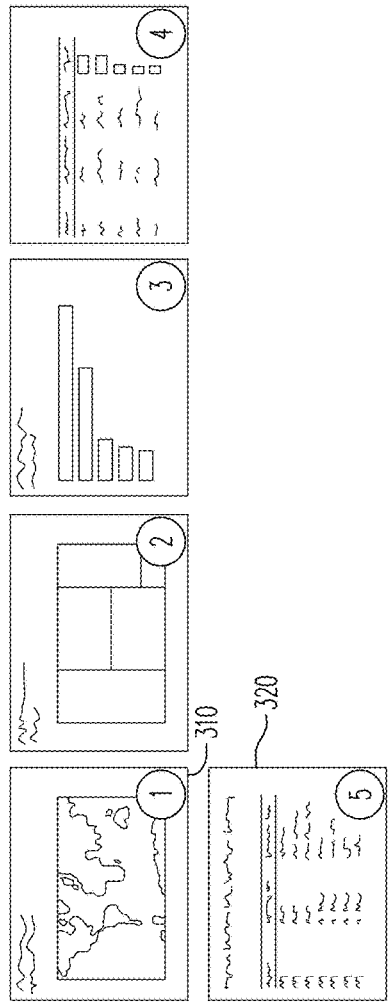

FIGS. 3A-3E illustrate a user interface 300 for customizing a geospatial visualization for a geographic area in accordance with an example embodiment. Referring to FIG. 3A, the user interface 300 may be a window shown on a display screen of a computing device such as a computer monitor, a laptop, a tablet, a mobile device, a kiosk, a television, an appliance, and the like. The user interface 300 includes an input bar 305 which allows a user to input information, for example, information about customized regions, common measures, geospatial files, data files, search queries, and the like. In this example, a geospatial file for generating a geographic area is already built into the user interface 300. In addition, a data file providing a custom region hierarchy for the geographic area is also built into the user interface 300. Therefore, in FIG. 3B, upon a user entering one or more of a common measure by region, predefined region information, customized region information, and the like, the user interface 300 may display a plurality of tiles providing geospatial information related thereto. In FIG. 3B, first tile 310 represents the geographic area divided into predefined regions and fifth tile 320 represents the data file which configures customized regions for the geographic area of the first tile 310.

FIG. 3C illustrates a drag and drop operation that may be performed by a user. In this example, the user selects the fifth tile 320 corresponding to the data file and drags and drops the fifth tile 320 within proximity to the first tile 310 on a display screen of the user interface 300, for example, using a mouse, a touch screen, and the like. In response, a processor executing the user interface 300 may determine that the user has entered a command to create a modified display of the geographic area including customized regions. In FIG. 3D the user interface 300 displays a determination indicating that custom regions are to be produced for the geographic area in the first tile 310 based on the customized geographic regions configured by the data in the fifth tile 320. In addition, the user interface 300 may display a choice of customized dimensions, for example, in a case where the data file corresponding to the fifth tile 320 is capable of modifying the geographic area into multiple customized dimensions (in this case two different types of custom regions). For example, the data file may configure the geographic area such that customized regions corresponding to market unit, region, country, city, state, and the like, are displayed within the geographic area instead of the predefined regions.

Accordingly, the user may select one or more customized dimensions from among a plurality of possible dimensions that may be displayed by selecting a choice on the user interface and selecting OK. FIG. 3E illustrates the user interface 300 showing second tile 331 having first customized regions for the geographic area and third tile 332 having second customized regions for the geographic area. For example, first customized regions may correspond to individual countries and second customized regions may correspond to aggregates of countries. Behind the scenes, the user interface 300 may generate geographic files in which the geographic area is modified from its original version. For example, the user interface 300 may generate a GeoJSON file representing the modified display of the geographic area in the second tile 331 and a GeoJSON file representing the modified display of the geographic area in the third tile 332 based on the geographic area of the first tile 310 and the data included in the fifth tile 320. The user interface 300 may also generate a separate data file representing the modified display of the geographic area in the second tile 331 and a separate data file representing the modified display of the geographic area in the third tile 332.

Figure 4A:
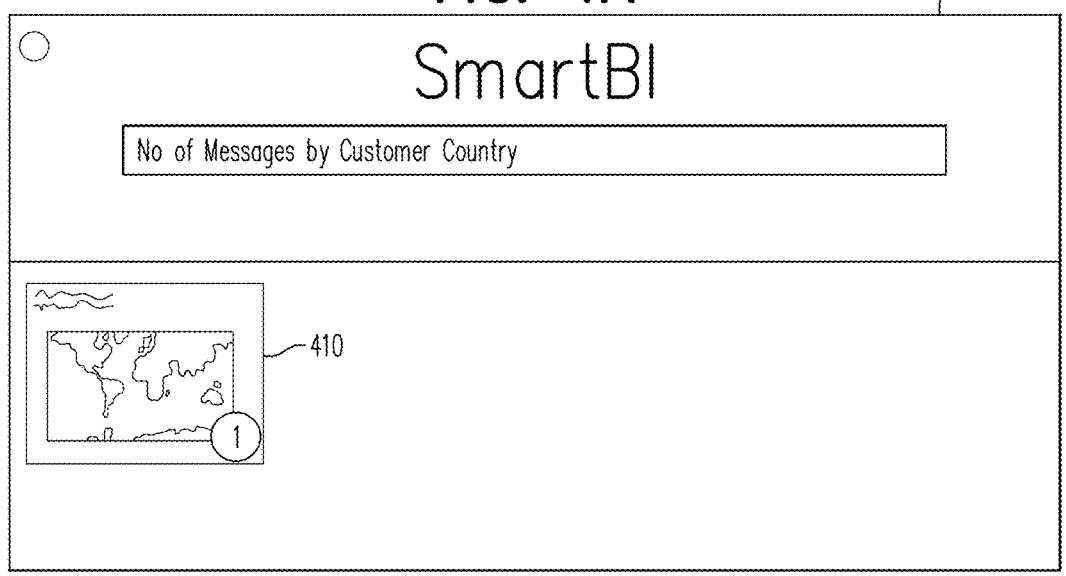
Figure 4B:
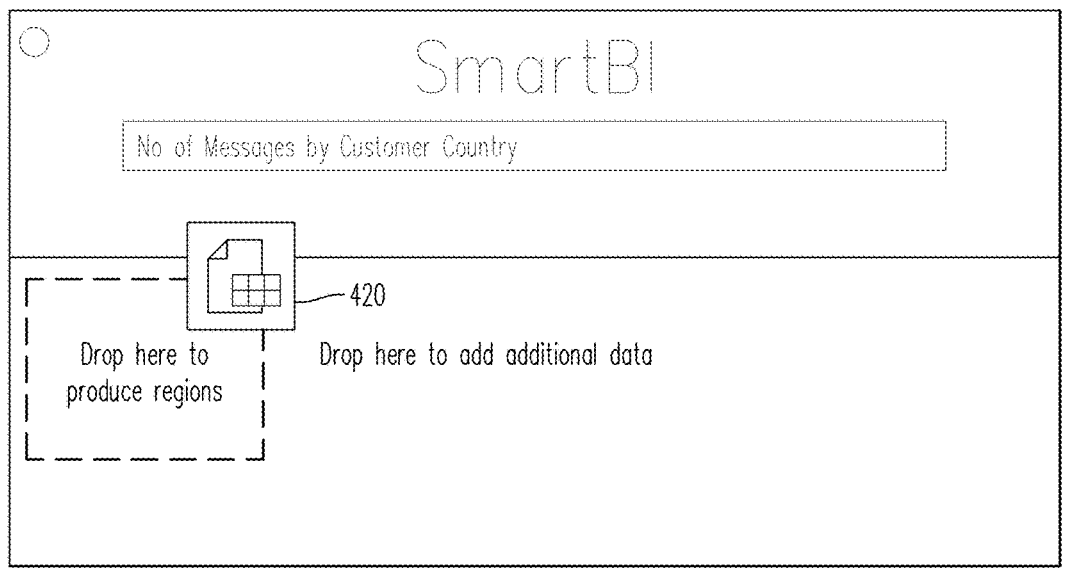

FIGS. 4A-4D illustrate a user interface 400 for customizing a geospatial visualization for a geographic area in accordance with another example embodiment. In this example, a geospatial file for generating a geographic area is built into the user interface 400 and a data file is added from an external source. Referring to FIGS. 4A-4D, the geospatial file when execute displays a geographic area having predefined regions and the geographic file is built into the user interface 400. Also, in this example a data file configuring customized regions for the geographic area is added from an external source. A user may enter geospatial information into the input bar shown on the user interface 400. Because the geographic area having predefined regions is included within the user interface 400, the user interface 400 may display a tile 410 indicating the predefined regions for the geographic area. In FIG. 4B, the user interface 400 displays an empty region (e.g., a drop zone) on the screen which is capable of receiving an icon corresponding to a data file. In this example, a user may add a data file from an external source such as a local memory, the internet, an external memory, and the like, to a computing device that is displaying the user interface 400. The user may select an icon 420 corresponding to the data file shown on a display and drag and drop the icon 420 at or near the empty region. In response, the user interface 400 may determine that the user is requesting to modify the built in geographic file with the added data file represented by icon 420.

In FIG. 4C, the user interface 400 displays a determination indicating that custom regions are to be produced for the geographic area in the tile 410 based on data configuring customized regions included in the data file 420 added from an external source. In addition, the user interface 400 may display a choice of customized dimensions. Here the user may choose to display the customized regions by only one dimension (i.e., one customized region) and a display of the modified geographic area from tile 410 may be displayed in FIG. 4D as shown in tile 430 in which customized regions replace the predefined regions of FIG. 4A for the geographic area.

Figure 5A:
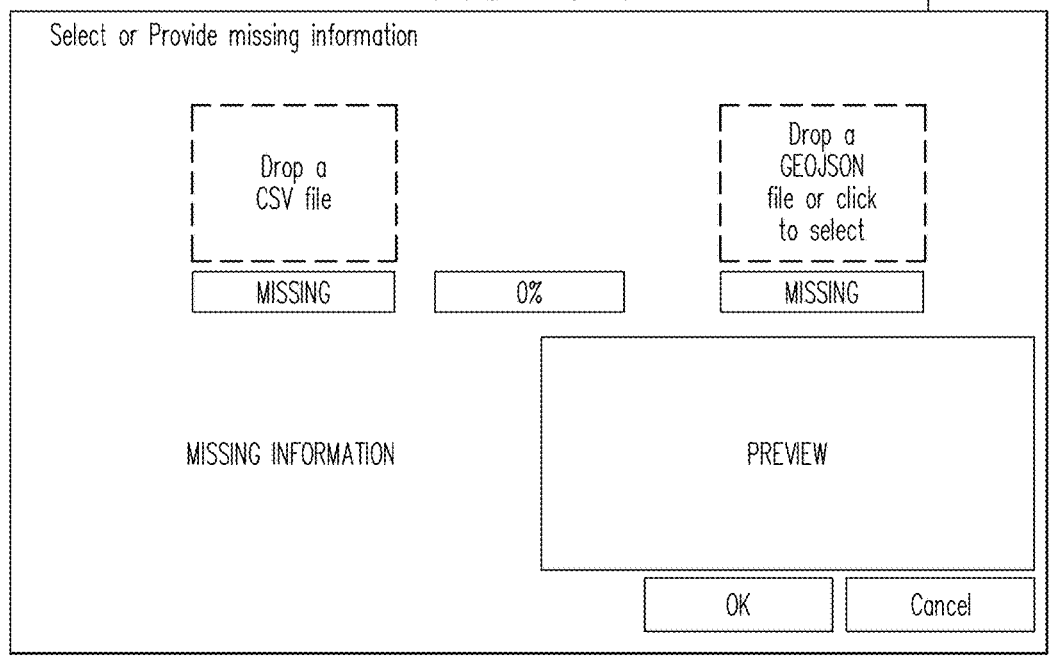
Figure 5B:
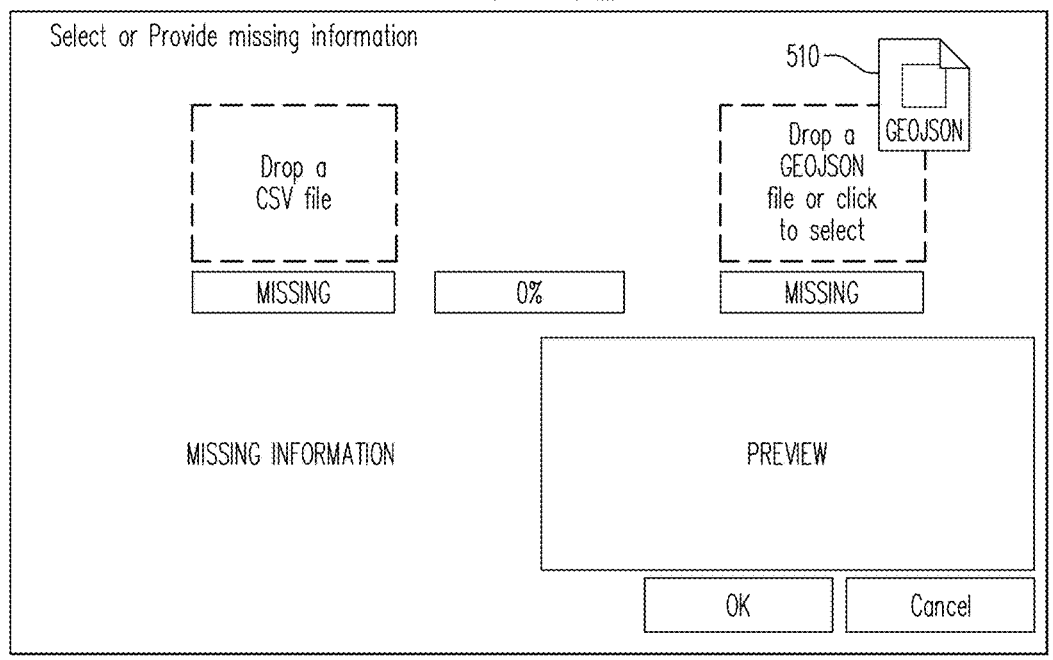

FIGS. 5A-5E illustrate a user interface 500 for customizing a geospatial visualization for a geographic area in accordance with another example embodiment. In this example, both a geospatial file and a data file are added from an external source. Referring to FIG. 5A, a display of the user interface 500 is shown in which drop zones for a geospatial file and a data file are shown. In FIG. 5B, a user command drags and drops an icon corresponding to a geospatial file 510 within a proximity of the drop zone for the geospatial file on the user interface 500. In FIG. 5C, a user command drags and drops an icon corresponding to a data file 520 within a proximity of the drop zone for the data file on the user interface 500. In response to both commands, the user interface 500 may determine to generate a modified display for a geographic area included in the geospatial file 510 using data included in the data file 520.

Figure 5D:
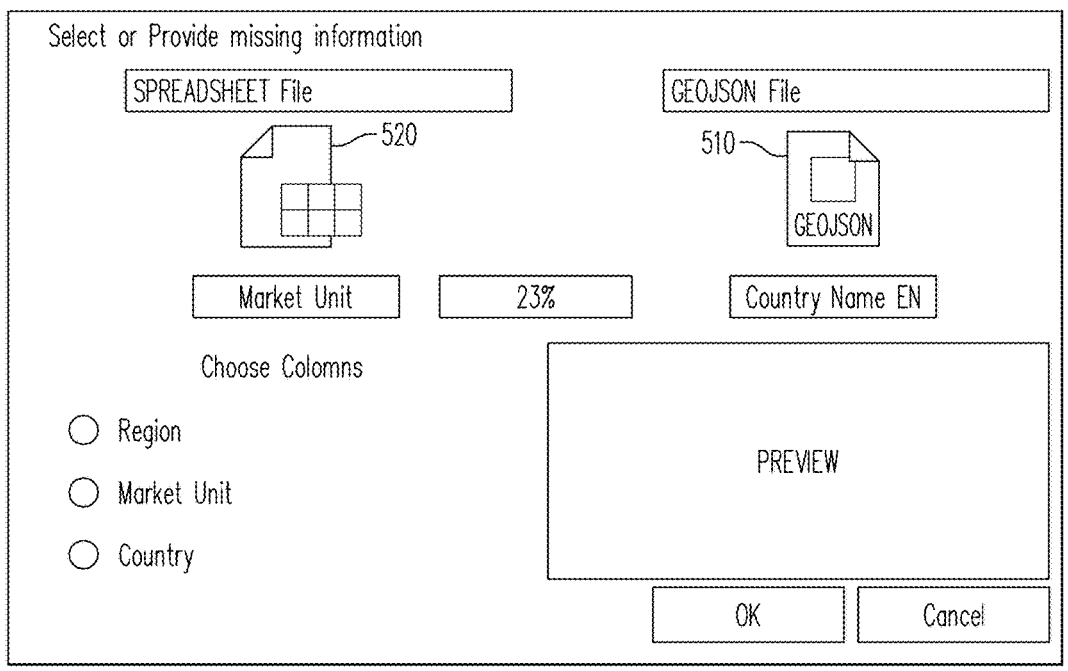
Figure 5E:
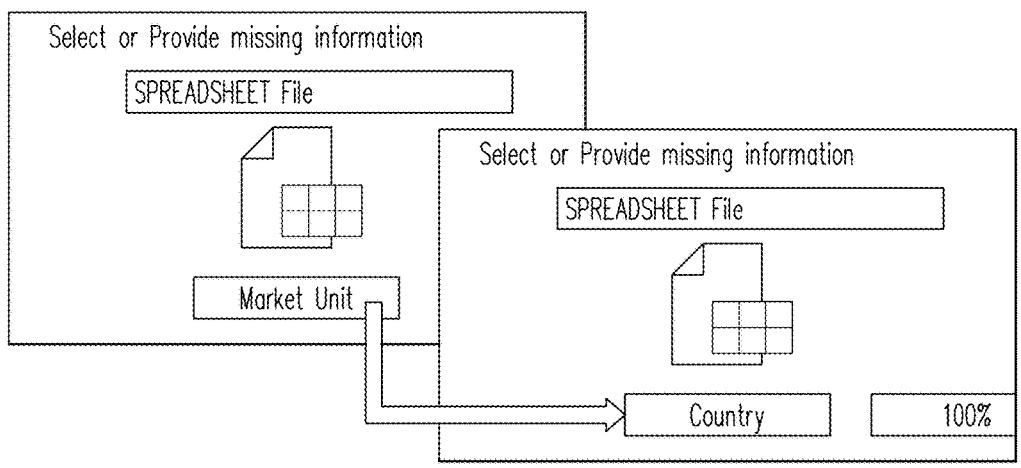

In response to the user dragging and dropping the geospatial file 510 and the data file 520 to a predetermined position on the user interface 500, the system may display a list of choices for customized regions for the user to choose from, or may display a default group of customized regions in FIG. 5D. In this example, the user may choose from customized regions based on region, market unit, country, and the like. FIG. 5E shows the user selecting market unit as the customized region dimension. Also, even though not selected at this time by the user, customized regions based on region and country are also available to the user. Furthermore, the user may enter additional information at any time through an input bar of the user interface 500. For example, the user may input information about common measures, regions, and the like.

Figure 7:
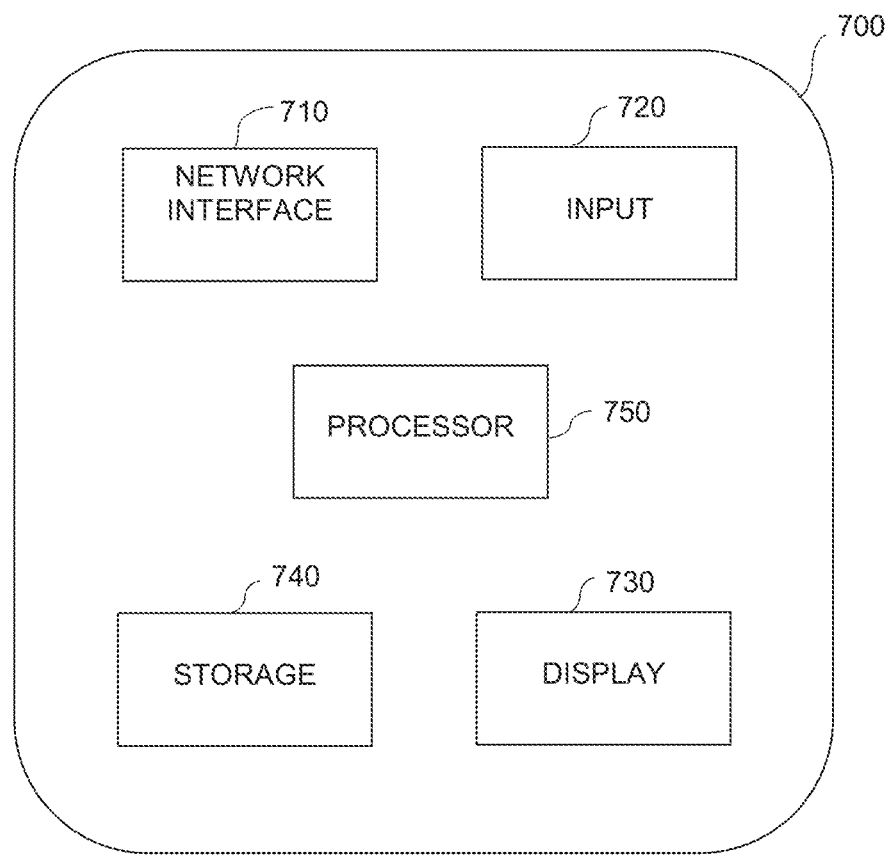
FIG. 7 is a diagram illustrating a custom region producing device in accordance with an example embodiment.

FIG. 7 illustrates a custom region producing device 700 in accordance with an example embodiment. The custom region producing device 700 may generate and display the user interface shown in the previous examples herein and display the user interface on a monitor that is electronically connected to the custom region producing device, or on another device that is connected to the custom region producing device through a network and/or a cloud. Referring to FIG. 7, the custom region producing device 700 includes a network interface 710, an input 720, a display 730, a storage 740, and a processor 750. The custom region producing device 700 may be a computer, a tablet, a mobile device, a laptop, a notebook, and the like. The network interface 710 may be capable of transmitting and receiving data over a network such as the Internet. Also, the network interface may include a receiver and/or a transmitter that acts as a radio interface capable of transmitting and receiving data through radio signals, and the like. The input 720 may include any known components for receiving user input, for example, a mouse, a keyboard, keypad, motion detector, speech recognizer, and the like. Also, it should be appreciated that the custom region producing device 700 may include additional components not shown in FIG. 7, or may not include all of the components shown in FIG. 7.

In this example, the storage 740 may store a geospatial file that when executed displays an outline of a geographic area divided into predefined regions on the display 730, and store a data file that configures customized regions for the geographic area. According to various example embodiments, the processor 750 may generate a modified display for the geospatial file based on the data file. The modified display may include an outline of the geographic area divided into the customized regions instead of the predefined regions. As shown in the examples herein, the geospatial file and the data file may be represented by icons on a display screen of the display 730, and the processor 750 may generate the modified display in response to detecting the icon corresponding to the data file being dragged and dropped by a user command within a predetermined location with respect to the icon corresponding to the geospatial file on the display screen. In generating the modified display, the processor 750 may remove the predefined regions from within the outline of the geographic area and replace them with the customized regions. Also, the processor 750 may generate a modified geospatial file based on the geospatial file and the data file, the modified geospatial file may display the outline of the geographic area divided into the customized regions when executed.

The geospatial file may be received from an external source through the network interface 710 or it may be generated locally. Likewise, the data file may be received from an external source such as through the network interface 710 or it may be generated locally. The data file may include a plurality of fields for each predefined region including a first field identifying a respective predefined region, a second field identifying an amount of a common measure in the respective predefined region, and a third field identifying a customized region to which the respective predefined region belongs. As another example, the input 720 may receive an input from a user indicating a common measure for each of the customized regions, and the processor 750 may generate the modified display to further display an amount of the common measure with respect to each of the customized regions.

Figure 8:
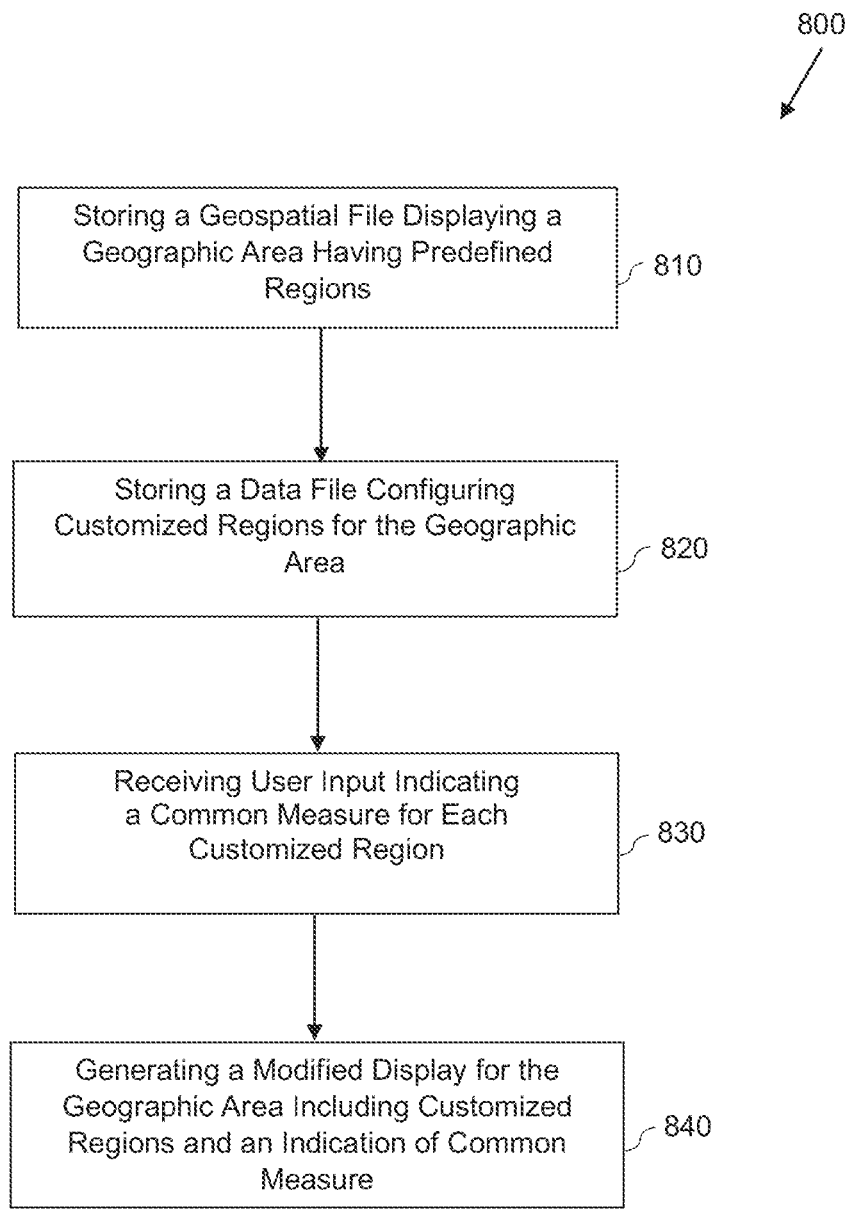
FIG. 8 is a diagram illustrating a method for customizing a geospatial visualization in accordance with an example embodiment.

FIG. 8 illustrates a method 800 for customizing a geospatial visualization in accordance with an example embodiment. For example, the method 800 may be performed by the custom region producing device 700. Referring to FIG. 8, the method 800 includes storing a geospatial file that when executed displays an outline of a geographic area divided into predefined regions on the display, in 810. For example, the geospatial file may display a map of a country, a continent, the earth, a city, a town, a county, and the like. The predefined regions may further divide the geographic area into smaller regions. The method 800 further includes storing a data file that configures customized regions for the geographic area, wherein the customized regions are different than the predefined regions, in 820. The data file may contain data identifying customized regions within the geographic area corresponding to the geospatial file. The method 800 further includes receiving an input from a user indicating a common measure for each of the customized regions in 830. For example, the user may input a common unit, widget, or the like, for each region using an input bar of a user interface.

The method 800 also includes generating a modified display for the geographic area based on the data file, the generated modified display comprising an outline of the geographic area divided into the customized regions, in 840. In some examples, the generating in 840 may include generating a display of an amount of the common measure with respect to each of the customized regions based on the input received in 830. In some cases, icons representing the geospatial file and the data file may be displayed. In this example, the generating of the modified display for the geographic area may be performed in response to detecting the icon corresponding to the data file being dragged and dropped by a user command within a predetermined location with respect to the icon corresponding to the geospatial file on the display. The generating in 840 may include generating the modified display for the geographic area by removing the predefined regions from within the outline of the geographic area and replacing them with the customized regions. Although not shown in FIG. 8, the method may further include generating a modified geospatial file based on the geospatial file and the data file, where the modified geospatial file is configured to display the outline of the geographic area divided into the customized regions when executed.

Figure 9:
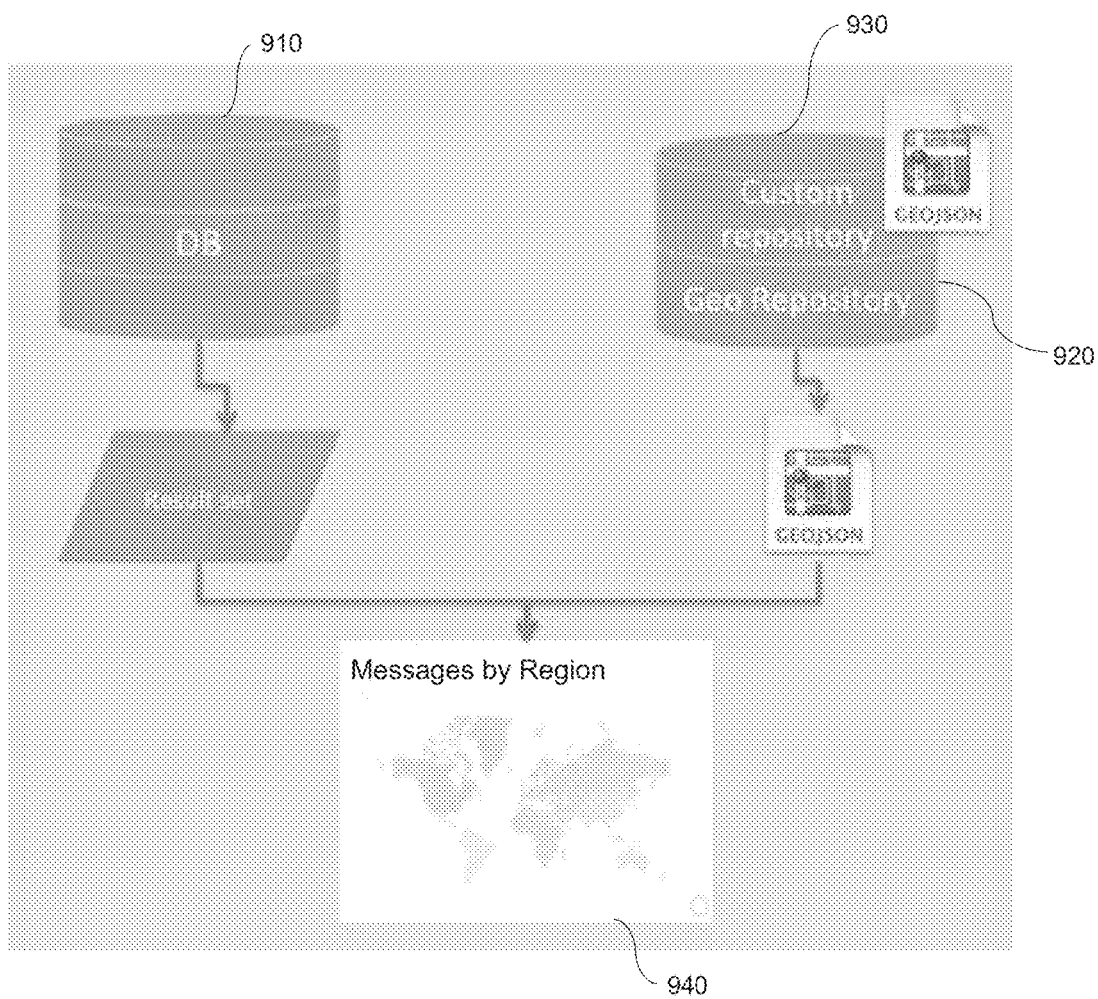
FIG. 9 is a diagram illustrating a system for customizing a geospatial visualization in accordance with an example embodiment.

FIG. 9 illustrates a system for customizing a geospatial visualization in accordance with an example embodiment. Referring to FIG. 9, the system includes a database 910 for storing data files such as spreadsheet files, .xls files, .csv files, and the like. The system also includes a geographic repository 920 for storing geospatial files that when executed generate a display of a geographic area having predefined regions. Also, the system includes a custom repository 930 for storing customized geospatial files that when executed generate a display of the geographic area having customized regions in place of the predefined regions. According to various aspects, a geospatial file stored in geographic repository 920 may be combined with a data file from database 910 to generate a customized geospatial file in which a geographic area has customized regions instead of predefined regions as shown in the displayed custom geographic area 940. The customized geospatial file may be stored in the custom repository 930 and may be used again.

According to various examples, a geospatial visualization may be customized by simply combining information from a geospatial file with information from a data file. There is no need for a programming to modify code or formatting of a file. The geospatial file initially displays a geographic area divided into a plurality of regions that are predefined based on one or more factors. The data file configures custom regions for the geographic area that may be based on the predefined regions. For example, a custom region may include a plurality of predefined regions. In response to a user input, a display of the geographic area may be modified such that the predefined regions are removed and the custom regions are displayed based on a user input or user command.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A computing device for customizing a geospatial visualization, the computing device comprising:
    a storage configured to store a geospatial file that displays a boundary outline of a geographic area divided into predefined regions within the boundary outline which are defined in advance by a software application; and
    a processor configured to
        receive a data file comprising a table of customization data that configures customized regions for the geographic area which change the predefined regions defined in advance by the software application,
        map the predefined regions in the geospatial file to customized regions in the received data file based on at least one field of the customization data included in the received data file;
        modify geographical outlines of the predefined regions within the boundary outline of the geographic area of the geospatial file into the customized regions based on the mapping to generate the customized regions within the boundary outline of the geographic area that are different in size and shape with respect to the predefined regions, and
        output a display of the geographical area including the customized regions within the boundary outline.

2. The computing device of claim 1, wherein the geospatial file and the data file are represented by icons on a display screen, and the processor is configured to generate the customized regions in response to detecting the icon corresponding to the data file being dragged and dropped by a user command within a predetermined location with respect to the icon corresponding to the geospatial file on the display screen.

3. The computing device of claim 1, wherein the geospatial file comprises a Geographic JavaScript Object Notification (GeoJSON) file format and the data file comprises a spreadsheet format.

4. The computing device of claim 1, wherein the data file comprises a plurality of fields for each predefined region of the geographic area including a first field identifying a respective predefined region, a second field identifying an amount of a common measure in the respective predefined region, and a third field identifying a customized region to which the respective predefined region belongs.

5. The computing device of claim 1, wherein the predefined regions divide the geographic area into a plurality of non-overlapping polygons respectively, and at least one customized region includes an aggregate of at least two predefined regions including at least two non-overlapping polygons.

6. The computing device of claim 1, wherein the processor is configured to generate the customized regions by removing the predefined regions from within the outline of the geographic area and replacing them with the customized regions.

7. The computing device of claim 1, further comprising an input to receive an input from a user indicating a common measure for each of the customized regions, and
    the processor is further configured to display of an amount of the common measure with respect to each of the customized regions.

8. The computing device of claim 1, wherein the processor is configured to generate a new geospatial file comprising the display of the outline of the geographic area divided into the customized regions.

9. The computing device of claim 1, wherein the processor maps the predefined regions to the customized regions based on International Organization Standard (ISO) data stored in the geospatial file and ISO data stored in the data file.

10. A method comprising:
    storing a geospatial file that displays a boundary outline of a geographic area divided into predefined regions within the boundary outline which are defined in advance by a software application;
    receiving a data file comprising a table of customization data that configures customized regions for the geographic area which change the predefined regions defined in advance by the software application;
    mapping the predefined regions in the geospatial file to customized regions in the received data file based on at least one field of the customization data included in the received data file;
    modifying geographical outlines of the predefined regions within the boundary outline of the geographic area of the geospatial file into the customized regions based on the mapping to generate the customized regions within the boundary outline of the geographic area that are different in size and shape with respect to the predefined regions; and
    outputting a display of the geographical area including the customized regions within the boundary outline.

11. The method of claim 10, further comprising displaying icons representing the geospatial file and the data file, respectively, wherein the modifying comprises generating the customized regions for the geographic area in response to detecting the icon corresponding to the data file being dragged and dropped by a user command within a predetermined location with respect to the icon corresponding to the geospatial file on a display screen.

12. The method of claim 10, wherein the geospatial file comprises a Geographic JavaScript Object Notification (GeoJSON) file format and the data file comprises a spreadsheet format.

13. The method of claim 10, wherein the data file comprises a plurality of fields for each predefined region of the geographic area including a first field identifying a respective predefined region, a second field identifying an amount of a common measure in the respective predefined region, and a third field identifying a customized region to which the respective predefined region belongs.

14. The method of claim 10, wherein the predefined regions divide the geographic area into a plurality of non-overlapping polygons respectively, and at least one customized region includes an aggregate of at least two predefined regions including at least two non-overlapping polygons.

15. The method of claim 10, wherein the modifying comprises removing the predefined regions from within the outline of the geographic area and replacing them with the customized regions.

16. The method of claim 10, further comprising:

receiving an input from a user indicating a common measure for each of the customized regions, and displaying an amount of the common measure with respect to each of the customized regions.

17. The method of claim 10, further comprising generating a new geospatial file comprising the display of the outline of the geographic area divided into the customized regions.

18. A method comprising:

receiving a geospatial file that displays a boundary outline of a geographic area divided into predefined regions within the boundary outline which are defined in advance by a software application;

mapping the predefined regions in the geospatial file to customized regions in a data file based on at least one field of customization data included in the data file which change the predefined regions defined in advance by the software application;

modifying geographical outlines of the predefined regions within the boundary outline of the geographic area of the geospatial file into the customized regions based on the mapping to generate the customized regions within the boundary outline of the geographic area that are different in size and shape with respect to the predefined regions; and displaying a modified display for the geographic area comprising the boundary outline of the geographic area divided into the customized regions.

19. The method of claim 18, wherein the modifying comprises removing the predefined regions from within the outline of the geographic area and replacing them with the customized regions.

20. The method of claim 18, further comprising receiving a common measure for each customized region input from a user, and displaying an amount of the common measure with respect to each customized region.

21. The method of claim 18, wherein the geospatial file comprises a Geographic JavaScript Object Notification (GeoJSON) file format and the data file comprises a spreadsheet format.

* * * * *